Sept. 20, 1960 W. T. WINTRINGHAM 2,953,638

MULTIPLE BEAM SCANNING SYSTEM

Filed Dec. 30, 1957 2 Sheets-Sheet 1

INVENTOR
W. T. WINTRINGHAM
BY Harry C. Hart
ATTORNEY

Sept. 20, 1960 W. T. WINTRINGHAM 2,953,638

MULTIPLE BEAM SCANNING SYSTEM

Filed Dec. 30, 1957 2 Sheets-Sheet 2

INVENTOR
W. T. WINTRINGHAM
BY Harry C. Hart
ATTORNEY

United States Patent Office 2,953,638

Patented Sept. 20, 1960

2,953,638

MULTIPLE BEAM SCANNING SYSTEM

William T. Wintringham, Chatham, N.J., assignor to Bell Telephone Laboratories, Incorporated, New York, N.Y., a corporation of New York Filed Dec. 30, 1957, Ser. No. 705,977

14 Claims. (Cl. 178—6)

This invention relates to the translation, transmission, reception and reproduction of electric image signals and the like, and more particularly to a scanning system for low resolution applications.

Progress in electronic picture transmission, facsimile, and related fields has developed to such an extent that text or pictorial information may now be economically and accurately transmitted from one location to another. Although the advances in these fields have been possible the development of systems having relatively low cost, ease of operation and reliability, there remains the economic need for a reduction in the electrical channel width required for such electric signals, together with an accompanying increase in the speed of transmission.

In the field of facsimile, transmission economy in each of these respects may be attained by analyzing successively the optical densities of individual elements of the printed text or pictorial copy to be transmitted with an electron beam, spot of light, or the like, whose linear dimensions are substantially greater than those of the finest detail in the copy. Although such a process of instantaneously exploring the individual elements of the copy with an enlarged aperture to produce their electrical signal counterparts, commonly called scanning, permits the transmission time to be held to a suitably short period of time, it is, of course, at the expense of signal resolution. Moreover, fine detail portions of the material, i.e., those having smaller linear dimensions than the scanning aperture, may be lost altogether so that the facsimile service loses its intended usefulness. These losses are generally referred to as "aperture effects."

In an application of J. R. Hefele, Serial No. 677,583, filed August 12, 1957, a facsimile system is disclosed which effectively prevents such losses and yet effects a substantial reduction in the bandwith-time product of signals transmitted thereover. Transmission economy is achieved by selecting the channel bandwith, the speed of transmission, and the resolution necessary for a just satisfactory reproduction at the receiver station in strict accordance with the character of the particular service to be rendered and with the nature of the material to be transmitted. Fine detail components of the signal are preserved during transmission over a channel having a reduced bandwidth-time product by scanning with a small dimension aperture and by predistorting selected components derived thereby in a preassigned fashion prior to transmission. More particularly, the signals describing the very thinnest lines contained in the material are modified prior to transmission in two significant respects. First, successively derived electrical signals are restricted, by signal slicing, for example, to either one of two values, e.g., black and white, without intermediate shades and, second, each derived pulse representative of a narrow vertical line in the copy whose width is less than a preassigned minimum is converted to a pulse whose width is equal to or greater than the preassigned minimum. Thus, although the signals, as modified, still contain the essential characteristics of the original signal, they have been converted to a form which is in some respects superior to the original and is, moreover, especially tailored to the definition demands of the intended service and the accommodation of the transmission channel. Neither of these departures in any way reduces the intelligibility of the copy but oftentimes enhances its readability. At the receiver station, the modified signals are immediately available for producing a pictorial record of the copy with a normally large scanning beam without the necessity of a reconversion to their original unmodified form. This is, of course, a great advantage since it markedly reduces the complexity of the receiver terminal equipment.

Horizontal detail is faithfully preserved in the aforementioned Hefele application by scanning the field of view with an effective scanning aperture or spot of smaller than normal dimensions in the direction of scanning. For convenience, this is termed the X direction. Since the vertical resolution requirements may be somewhat relaxed without seriously impairing the reproduction, the total number of scanning lines per field is substantially reduced, i.e., the distance separating successive lines is increased. To prevent thin lines positioned at small angles with respect to the scanning or X direction from being missed in the scanning process, the scanning aperture is elongated in a direction perpendicular to the direction of scanning. This is conveniently termed the Y direction. Nevertheless, those thin lines embraced by only a small fraction of the scanning aperture tend to dilute the output signal to a value below the slicing level of the processing amplifier so that these signals may be lost altogether prior to transmission. Although this effect may be minimized by lowering the slicing level, the saving is at the expense of signal-to-noise ratio.

It is a principal object of the present invention to measurably improve the resolution capabilities of a transmission system while simultaneously effecting a substantial reduction in the width of the required transmission frequency band, as compared with the bandwith required for transmission in accordance with the methods commonly in use.

It is another object of the invention to retain the effects of high resolution scanning in low resolution scanning systems.

According to the present invention, the desirable attributes of high resolution scanning are retained in a low resolution system by dividing a field of view into a plurality of distinct groups of individually resolvable elements, and systematically and simultaneously exploring the individual elements of each of these groups with one of a plurality of effective scanning apertures each having smaller than normal scanning aperture dimensions. For each group of elements explored, a sequence of electrical analogue pulses is obtained in which the duration of each individual pulse is representative of a dimension of a single element. Simultaneous sequences of pulses, produced by all of the apertures together, represent the electrical analogue equivalent of the total area explored in each traverse or scanning of the field of view. Consequently, the simultaneous sequences contain a great number of individual pulses, transmission of which requires a high bandwidth-time product.

According to a feature of the invention, this product is substantially reduced by processing the several sequences in a fashion such that the quantitative value of each pulse in each of the sequences is preserved and the exact spatial relationship of the picture elements represented by the pulses is preserved only sufficiently to permit an acceptable reproduction to be produced at a receiver station employing a scanning beam having a large spot dimension. More particularly, a pulse produced by any one of the plurality of apertures in scanning a line of the field of view is established at a predetermined amplitude level. Thus, a single resolvable element, for which there is no corresponding element in adjacent lines, is explored by only one small aperture comparable in size to the element and is converted to an undiluted output combined so that a composite signal pulse represents one pulse of sufficient level for satisfactory transmission. The independent pulses so produced are not, however, independently transmitted as taught by the known art but are or all of the several pulses produced at any instant in scanning the field of view.

By virtue of this processing, the electrical counterparts of elements in each of the several groups, which may be, for example, areas or lines within the field of view, are concentrated into a composite signal. Such a signal may be converted into a visible image reproduction of the original by a scanning beam of normally large dimensions, that is, whose dimensions are on an order of magnitude equal to the sum of the dimensions of the individual apertures at the transmitter. The reproduction contains information relating to all elements resolved at the transmitter, and is, therefore, superior to that obtained with scanning techniques using a single aperture of large dimensions at both the transmitter and the receiver.

To improve further the efficiency of the system, and to impart to the electrical signals a high degree of immunity both to the loss of peak amplitude of the narrower signal pulses and to the associated high degree of degradation normally encountered in the transmission of such signals over a band-limited channel, it is in accordance with the invention to modify the signals prior to transmission in such a way as to effectively preserve their peak amplitudes. As discussed in the aforementioned Hefele application, it has been found that the absolute width of the lines forming the finest parts of typed characters or strokes of written material need not be preserved accurately so long as the spatial configurations or forms of the characters or strokes are preserved. It is in accordance with the present invention to reinforce each one of the several pulses, representative of the thinnest lines in the copy, produced in the plurality of scans in each traverse of the field. More particularly, all of the analogue pulses emanating from the several apertures of the scanner are selectively stretched in accordance with one of various stretching programs. A simple possibility is to stretch all pulses by a constant amount. However, this means that a pulse which is already of adequate duration for transmission is stretched unnecessarily. In accordance with a preferred embodiment of the invention, a stretching program is followed in which only pulses shorter than those resulting from scanning with an aperture, whose X dimension corresponds in time to the period D, are stretched to duration D while all longer pulses are left completely unchanged. In this form of nonlinear stretching, compatibility is maintained between the fine detail resolvability necessary at the transmitter station scanner in order to preserve thin line material, and the less stringent requirements in the ability of the receiver station scanner to reproduce the received picture material.

The invention will be fully apprehended from the following detailed description of certain illustrative embodiments thereof taken in connection with the appended drawings, in which.

Figures 1, 2A, 2B, 6:
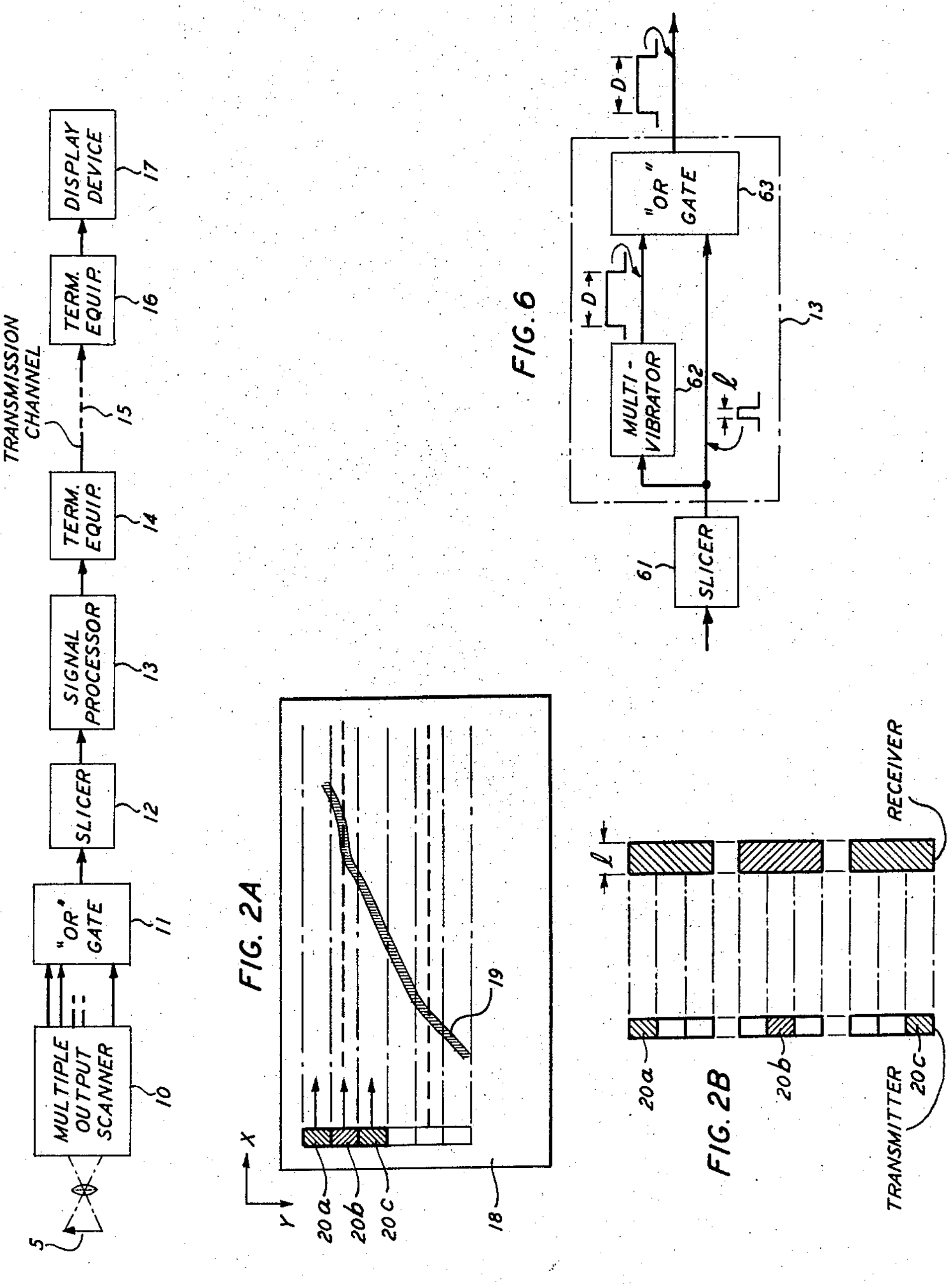
Fig. 1 is an overall block schematic diagram showing the relationship of various circuit components employed in the practice of the invention.
Fig. 2A is a pictorial representation of a field of view illustrating the multiple path scanning technique according to the invention.
Fig. 2B is a diagram helpful in illustrating the principle of operation of the multiple aperture scanning system.
Fig. 6 is a block schematic diagram illustrating a signal processing unit in accordance with the invention.

Referring now to Fig. 1, a simple image transmission system in accordance with the invention employs a multiple channel scanning apparatus 10 for converting an optical image of a field of view 5 into a complex electric image signal as a function of time. In accordance with a principal feature of the present invention, substantial parallel areas or lines within the field are simultaneously explored with a plurality of scanning apertures or spots all of whose linear dimensions are smaller than those of the finest detail in the field. In order that the peak-to-peak value of the signals derived from the scanner represent satisfactorily the peak-to-peak reflectance characteristics of the copy, the dimensions of each of the individual apertures are less than the corresponding dimensions of the smallest detail in the field of view. As a result, the finest detail components, those comparable in size to the scanning aperture dimensions, are converted in the course of successive traverses of the field of view by each individual aperture to their electrical signal counterparts. One form of scanning apparatus suitable for simultaneously exploring a number of individual lines and for producing a like number of electrical analogue signals will be described below in connection with Fig. 3.

The plurality of electrical signals simultaneously produced in successive X direction traverses by the apertures of the scanner 10 are combined in a fashion that preserves the quantitative value of the derived information, relaxes the need for an accurate preservation of the spatial relationship of individual picture elements in the Y direction, and permits the signals representative of independent elements to be transmitted simultaneously to a receiver station. One way of combining the individually derived signal counterparts of picture elements into one, comprises selecting and emphasizing those signals in any one channel that represent information of a first kind, for example, dark picture elements, in such a way that it is readily distinguishable electrically from those portions representative of a second kind, for example, light or background material. A suitable circuit for effecting this combination, without interaction between the several inputs thereto, is a logic circuit, for example, an "OR" gate 11. This circuit may comprise any of the so-called "OR" type gate circuits well known as isolation devices in the computer art. It is a characteristic of these circuits that so long as there is an input signal impressed on any one of these input terminals, a signal is produced at its single output terminal. Gate 11 is supplied with the electrical signals produced at the several analogue output terminals of the scanner 10 and its output is a time sequence of analogue pulses each of which represents information of the first kind. The absence of a pulse in the sequence represents information of the second kind. For most business applications, two-valued or "binary" picture signals are eminently suitable for representing the typed, printed or written material found in the most usual kinds of business forms.

According to a preferred form of the invention, pulses emanating from "OR" gate 11 are further processed prior to transmission by passing them through a quantizer. For two-valued pulses, the quantizer may be a simple two-level slicer 12 of conventional construction. Alternatively, the slicing action, that is, the establishment of all pulses at one of two predetermined levels, may be performed in the "OR" gate 11. Additional levels corresponding to shades of gray, intermediate between black and white, may, of course, be established in accordance with the nature and demands of the particular service. In that event, the combining apparatus may be suitably modified and a multilevel quantizer of the type disclosed in B. M. Oliver, Patent 2,773,980, granted December 11, 1956, may be employed. In either case, each pulse established at the predetermined level is altered in duration by signal processer 13 in accordance with a non-linear stretching program. In the preferred stretching program, the duration of pulses representative of fine lines in the field of view is increased to a longer and minimum value so that the peak amplitudes of the pulses are satisfactorily accommodated by the transmission channel. These signals are then converted to a form suitable for transmission in terminal equipment 14, which may include the necessary modulators and transformers for coupling the signals to a program transmission channel, whereupon they may be transmitted in conventional fashion over channel 15 to a receiver station.

Receiving terminal equipment 16 includes the necessary transformers and demodulating units for preparing the received signals for utilization. Noise components may be removed, if desired, by subjecting the demodulated pulses to correction in a conventional slicer (not shown) before applying the signals to a display device 17. As mentioned previously, no reconversion of the received pulses to their original unmodified form is necessary. The received pulses may immediately be applied to the device 17 wherein they are converted through the action of a single, normally large scanning beam, following conventional scanning paths, to a visible image of the subject copy on a record medium. This medium may comprise any physical medium on which an image of the subject copy is reproduced such as, for example, electrostatic or electrothermal material. It preferably comprises a direct recording surface forming a part of a cathode beam tube using electrical storage. Direct view or display storage tubes suitable for this purpose are well known and may comprise, for example, one of the class of devices known commercially as the "Iatron" bright trace storage tube, or one of the devices of the class known as "Dark Trace Tubes," and the like.

The multiple path scanning program according to the invention, which departs from the well-known technique of employing the identical scanning pattern at the transmitter that is followed at the receiver, has a number of distinct advantages. All of the individual pulses transmitted specify with particularity the signal amplitude of the corresponding picture elements, but specify only generally the absolute spatial relationship of one element to another as established in the original material. Consequently, the scanning spot at the receiver station may be normally large to embrace the area of all of the individual aperture segments employed in a single traverse at the transmitter. Consequently, a receiver scanner may be used which employs conventional deflection without modifications. Hence, it is compatible with its normal operation in a low definition system. Since the exact value and position of each transmitted element is no longer necessary to render an acceptable reproduction and only a general knowledge of the exact position is required, the scanning pitch at the transmitter remains low with an attendant reduction in the bandwidth-time product necessary for satisfactory transmission. The receiver follows the same deflection pattern but in effect displays simultaneously the information derived from scanning each line at the transmitter with a plurality of individual apertures. Thus, one broad line displayed at the receiver contains all of the information embraced by each individual aperture independently at the transmitter.

Consider for a moment the case of single channel scanning. The size of the aperture employed is determined both by the dimensions of the finest pictorial material found in the matter to be transmitted and by the resolution with which it is to be transmitted. For example, in order to preserve the essential characteristics of picture material containing thin lines which measure approximately 5 mils in width, a resolution of approximately 200 lines per inch in both the vertical and horizontal directions is desirable. For such resolutions an aperture of slightly less than 2 mils diameter is entirely satisfactory. The scanning pitch must, however, be at least 500 lines per inch to permit all of the fine detail elements to be resolved. The electrical signals produced in scanning with an aperture of this size and at this pitch requires a high bandwidth-time product. Transmission over a reduced bandwidth channel requires then a long time for transmission. It is preferable to obtain this reduction by reducing the total number of scanning lines per field rather than by reducing the line scanning velocity. This choice permits the horizontal resolution of the picture to be preserved and at the same time permits ordinary horizontal deflection circuits to be employed. Thus, the scanning line pitch may be reduced, to approximately 175 lines per inch or less, for example, so that scanning may proceed in adjacent lines separated by approximately 5 mils.

Scanning with this pitch and with a 2 mil aperture leaves an unexplored area of 3 mils in width between adjacent lines. Although the scanning aperture may be elongated in the Y dimension to insure that all areas are explored, those thin lines extending primarily in the X direction within the field of view will tend to dilute the output signal by producing electrical pulses near or below the slicing level. Consequently, they may either be lost entirely or, if the slicing level is sufficiently lowered to accept them, the background noise level will correspondingly increase.

According to the present invention, scanning proceeds along parallel paths in the X direction spaced apart by a distance substantially greater than the linear dimension of a single fine dimension aperture. The above-mentioned difficulties are overcome, however, by utilizing a plurality of scanning apertures, each having small dimensions both in the X and in the Y directions and each being contiguously positioned within close limits in the Y direction. Consequently, a wide path is explored in each successive traverse of the field of view and yet all of the elements explored in each traverse are converted to electrical analogue signals with a resolution commensurate with the individual aperture dimensions.

Fig. 2A illustrates the multiple path scanning technique. A field of view 18 is shown with a single dark line 19 imposed on a light background. The multiple aperture 20 has a small dimension in the X direction and a considerably larger dimension in the Y direction. The Y dimension is divided into a number of separate elements, **20*a*, 20*b*, and 20*c*, in the instant example, which are contiguous within small limits. As discussed above, for high resolution in the Y direction, the Y dimension of the aperture must be small. However, in scanning with a single small spot with a deflection pitch substantially greater than the Y dimension of the spot, substantial portions of the field are left unexplored. The dashed lines in the X direction illustrate the paths followed in scanning with a single small spot (20*b*) at a large pitch. The other portions which may include thin X direction lines are missed entirely. Other thin lines may be reproduced as widely separated dots. According to the invention, however, the three elements 20*a*, 20*b*, 20*c*** are simultaneously deflected to explore a wide band of the field for each deflection at the large pitch illustrated by the dashed lines.

An output signal produced by any one segment of the spot is individually processed to assure that it is established as a full level output pulse and does not dilute the total output in the event that a corresponding signal is not simultaneously produced in one of the other channels. Fig. 2B illustrates this processing. In the figure, the multiple aperture 20 is illustrated in three representative positions; one in which only aperture segment **20*a* embraces a picture element, one in which segment 20*b* embraces an element, and one in which segment 20*c*** does so.

For a single elongated aperture the electrical pulse produced in scanning an element of this size would be diluted by the absence of picture material in the remainder of the area of the aperture. In the present invention, each element produces a full level output signal. At the receiver station scanner, a scanning beam whose area is equal to the total area of the three components of aperture 20 produces a full dark trace for each. The reproduction at the receiver is shown to the right in the figure.

Figure 3:
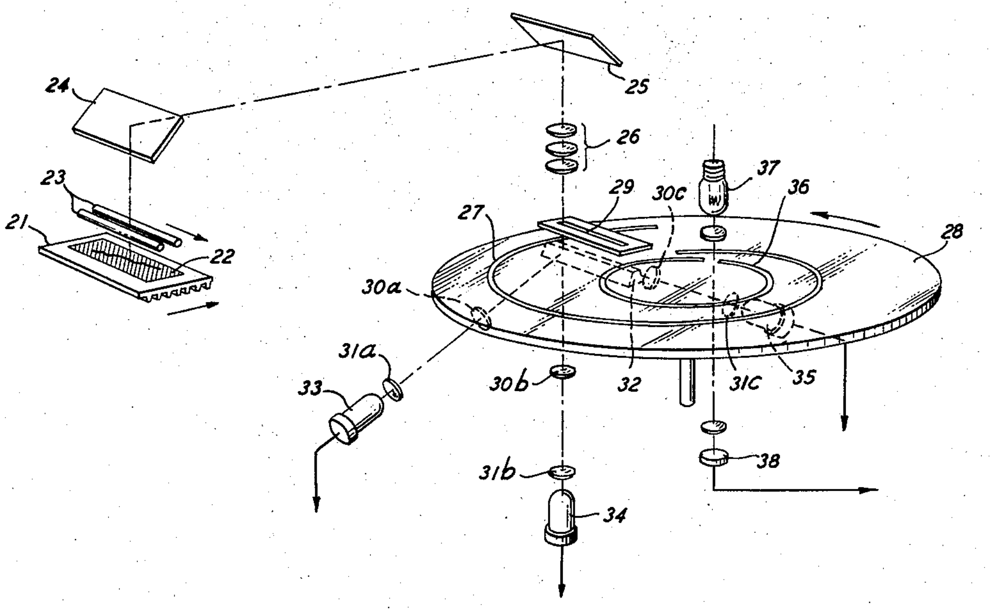
Fig. 3 is a diagram illustrating a suitable mechanical scanning apparatus for use in the practice of the invention.

Fig. 3 illustrates a mechanical scanning apparatus suitable for deriving the multiple channel output signals in accordance with the invention. It comprises a tray or carriage 21 on which may be placed the pictorial material to be transmitted, for example, a printed card 22. The card is positioned on the holder so that only the pertinent portions are exposed to scanning. The carriage 21 moves the material past a light source 23 which may comprise, for example, two fluorescent lamps which strongly illuminate the area being scanned.

An optical system, folded for space convenience by means of front surface mirrors 24 and 25, includes objective lens 26 which forms a reduced image of the card in the plane of the intersection of a clear spiral slit 27 on an opaque disc 28 and a straight slit 29 which is fixed parallel to the long side of the image. The clear spiral, conveniently formed on the disk 28 by photographic means, is slightly less than 2 mils in width to provide 1,000 resolvable picture elements over a sweep width of approximately 2 inches with a minimum of aperture distortion. The fixed slit 29 may be approximately 6 mils wide and 2 inches long. It may likewise be made photographically and may be placed close to the surface of the disk 28 carrying the spiral. The intersection of the spiral 27 and the straight slit 29 forms a rectangular aperture, elongated in the ratio of 3 to 1, which sweeps across the image at a constant speed when the disk 28 is rotated at a constant rate. The disk is rotated to cause the scanning aperture to move a distance of 2 inches across the fixed slit, for exery complete revolution of the disk; for example, if the disk is rotated at 20 revolutions per second, 20 line scans per second are produced. The single spiral slit on the disk may be interrupted for about 10 degrees in each rotation to furnish a short "black" signal at the end of each line scan to provide a suitable synchronizing pulse. Alternatively, line synchronizing signals may be derived directly from the rotating scanning disk 28 through a cleared circular slit 36. A small source of light 37 positioned above the slit 36 may be focussed on to a photo diode 38 positioned directly below. An opaque 10 degree section of the circular slit, properly positioned, interrupts this light to produce a pulse once per revolution or line scan. This pulse, when processed and added to the signal, may be used as a synchronizing signal to identify the beginning of each scanned line period.

Beneath the slit 29 and the spiral slit 27 is a multi-facet prism 32. Prism 32 is so positioned that the image of the aperture incident thereupon is divided into a number of equal elements which are contiguous within very small limits. For a three-facet prism 32, as shown, light corresponding to the center element of the aperture of light formed by the intersection of the slit 29 and the slit 27 passes through the prism without deflection and each of the two end elements is deflected away from the center line. By means of a condensing lens system 30 and 31 of wide aperture, the three individual elements, which together comprise an image of the objective lens 26, are focussed on to the respective cathodes of the multiplier photo tubes 33, 34 and 35. The condensing lens system should be as close as possible to the image plane of the prism. The light from each successive point of the pictorial material, as determined by the individual elements of the scanning aperture, is converted in these tubes to proportional electrical signals. A cathode follower may be employed with each to transform the high impedance of the photo tube so that the resulting electrical signal can be easily carried to the processing circuitry.

Figure 4:
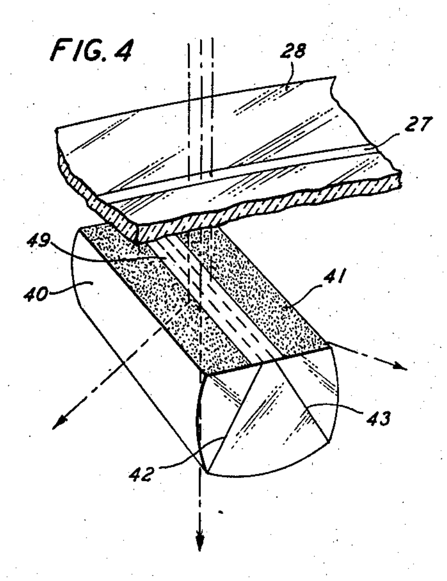
Fig. 4 is a diagram of another form of image beam separation appropriate for use in the scanning apparatus of Fig. 3.

It will be appreciated that various modifications may be made to the apparatus described in Fig. 3 without altering the principles involved, and that for specific applications entirely different scanning means may be advantageously employed in the practice of the invention. For example, Fig. 4 illustrates an optical apparatus 40 which may be used in place of the prism 32 in the scanner of Fig. 3. It both provides a narrow opening 49 corresponding to the fixed slit 29 for forming, in cooperation with the spiral slit 27, a suitable aperture, and means for dividing the image of the aperture so formed into three individual elements. Accordingly, the apparatus 40 comprises a multisection prism whose top plane surface 41 is coated with an opaque material except for a centrally-positioned longitudinal thin slit 49. The thin slit is positioned over the junction of the three segments of prism. The center segment passes the light incident thereon through the prism without deflection. Light incident on each side segment is deflected by mirror-like reflecting surfaces 42 and 43 respectively. The reflective surfaces may be produced by silver plating the planes forming the boundaries of junction of the prisms, or the like. Light incident on the two side portions is thus deflected and passes out through one of the side portions of the prism. The three exit sides may be convex to aid in the condensing of the light emerging from the prism.

Figure 5:
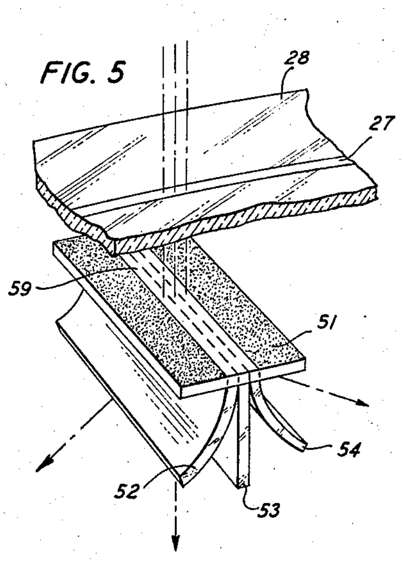
Fig. 5 is a diagram of an alternative form of image beam separating apparatus according to the invention.

Fig. 5 illustrates yet another means for dividing the image of the aperture into a number of separate elements. It comprises a plurality, three in the incident example, of light bending tubes 52, 53 and 54 contiguously arranged in a fashion such that the end portions terminate at an opaque plate 51 containing a thin, clear slit 59. Light passing through the aperture produced by the moving spiral slit 27 and the fixed slit 59 is focussed on the ends of the three light bending tubes. Only a portion is accepted by each tube. In well known fashion, that portion of the aperture image incident on the tube is transmitted through the tube and follows its spatial configuration. Light bending tubes of this sort are well known and may be formed, for example, from "Lucite" either as solid tubes or as bundles of extremely fine strands tightly bound together to form an integral unit. The outer surfaces of the tubes are preferably silver plated both to prevent cross talk and to act as a shield to prevent unwanted external light from entering the tubes. Each tube may be provided at its outer end portion with a transition section for transforming its rectangular cross section to a circular one. A suitable light shield may be employed to seal the end of each tube to the sensitive surface of a corresponding photo tube.

Although mechanical scanning, as hereinabove described, provides a convenient exploration means, in principle, of course, a conventional single beam scanner with appropriate storage or delay elements may serve equally well. With this arrangement, information derived by the action of the single scanning beam is sequentially read into the storage elements and later is simultaneously read out. Similarly, a plurality of individual cathode ray scanning devices arranged to focus and simultaneously deflect identical apertures or spots of light in identical deflection patterns may be used. The individual scanning spots are contiguously positioned and applied through selective color filters to the pictorial matter. The individually modulated beams are separated by color filters placed in front of the respective photo pick-up tubes corresponding to those at each light source.

Fig. 6 illustrates a signal processor suitable for use in the practice of the invention. In a typical two-level transmission system, before signals reach the apparatus of Fig. 6, they will have been converted to one of two representative levels of magnitude either by the slicer 12 or by the "OR" gate 11 of Fig. 1 acting as a slicer. This insures that the pulses applied to the signal processor 13 are suitably formed for efficient operation of the circuit. The output of the slicer is impressed on two paths. The first path includes a monostable multivibrator 62 having a relaxation period equal to D. The period D is determined primarily by the bandwidth of the channel over which the signals are to be transmitted. It may, for example, be equal to an interval equal to the reciprocal of two times the frequency bandwidth accommodated by the channel, commonly called the Nyquist interval. In conventional fashion, the leading edge of any input pulse triggers the multivibrator which in turn completes one cycle of oscillation in a period D and produces an output square wave pulse of duration D. The output of the multivibrator is coupled directly to an OR logic circuit 63. The second path couples the modified signal from the slicer 61 directly to the second input of OR circuit 63. In operation an incoming pulse, assumed to be positive and of duration $l$ in this illustration, reverses the state of multivibrator 62 for a period D, and energizes the OR circuit 63 for a period of duration $l$. The OR circuit output consequently is held negative so long as either the pulse of duration $l$ or the pulse of duration D persists. The later pulse to expire, after an elapsed time D or $l$, whichever is the greater, controls the output pulse duration. In the event that a second pulse appears at the input before the pulse of duration D has expired from the first triggering, the two pulses will emerge as a single pulse lasting from the beginning of the first to the end of the second.

Although the invention has been described with reference to certain specific embodiments, numerous modifications and other applications will readily occur to those skilled in the art.

What is claimed is:

1. In a narrow band image signal transmission system, the combination which comprises means including a plurality of independent exploring apertures arranged in close proximity to one another for simultaneously scanning contiguous areas of an image field of view in a succession of horizontal traverses, the axes of adjacent ones of said horizontal traverses being spaced apart by a distance greater than the linear dimensions of individual ones of said apertures, means responsive to said scanning operation by said several apertures for simultaneously converting significant image elements in said field embraced by said several apertures respectively, into their electrical signal counterparts, means for combining said electrical signal counterparts into a composite electrical signal, and means for reproducing from said composite electrical signal all elements embraced by any one of said apertures at a given instant as identical elements of a visual image.

2. In a narrow band image signal transmission system, the combination which comprises means including a plurality of independent apertures arranged contiguously in the vertical direction for simultaneously scanning an image field of view in a succession of horizontal traverses, the axes of adjacent ones of said horizontal traverses being spaced apart by a distance equal to the sum of the linear dimensions of all of said apertures in said vertical direction, means responsive to said scanning operation by each of said apertures for simultaneously converting significant image elements in said field embraced by each aperture into their electrical signal counterparts, means for combining said electrical signals into a composite electrical signal, and means for reproducing from said composite electrical signal all elements embraced by at least one of said apertures in like fashion as a visual image.

3. In a narrow band image signal transmission system, the combination which comprises means including a plurality of independent apertures arranged in close proximity to one another for simultaneously scanning an image field of view in a succession of horizontal traverses, the axes of adjacent ones of said horizontal traverses being spaced apart by a distance greater than the linear dimensions of individual ones of said apertures, means responsive to said scanning operation by said apertures for simultaneously converting image elements in said field embraced by each aperture at a given instant into an electrical analogue pulse, said pulse being representative of the specific light value of at least one of said elements, and means for producing from said pulse an image element simultaneously representative of all image elements embraced by said apertures at said instant.

4. In a narrow band image signal transmission system, the combination which comprises means for exploring parallel paths in an image field of view with a plurality of apertures each having smaller linear dimensions than the finest pictorial detail in said field to obtain corresponding sequences of signal pulses representative of the light values of those portions of said field explored by said apertures respectively, the axes of adjacent ones of said parallel paths being spaced apart by a distance substantially greater than the linear dimensions of individual ones of said apertures, means supplied with said sequences for establishing each one of said pulses at one or the other of two preassigned levels of magnitude, means for combining all of said pulses derived from said explorations of said parallel paths at the same instant into a composite elecrical signal, and means for reproducing from said composite signal all elements embraced by any one of said apertures at said one instant by means of a single electron beam modulated by said composite signals.

5. A visual communication system for transmitting signals representative of the light values of an object field over a narrow band channel which comprises, means at a transmitter station for scanning said entire field in a succession of horizontal traverses for obtaining a plurality of sequences of signal pulses, said means including a plurality of independent apertures arranged contiguously in the vertical direction, the linear dimensions of each of said apertures being smaller than those of the finest detail in said field, means for combining said sequences to form a train of composite signal pulses, said combining means including a logic "OR" gate circuit, means for transmitting said pulse train to a receiver station, and, at said receiver station, means for converting said pulse train into a visible image.

6. A visual communication system for transmitting signals representative of the light values of an object field over a narrow band channel which comprises, means at a transmitter station for scanning said entire field in a succession of horizontal traverses to obtain a plurality of sequences of signal pulses, said means including a plurality of independent apertures arranged contiguously in the vertical direction, the linear dimensions of each of said apertures being smaller than those of the finest detail in said field, means for combining said plurality of sequences of signal pulses to form a single sequence of composite signal pulses, means for transmitting said modified pulse sequence to a receiver station, and means at said receiver station, for converting said modified sequence of said pulses into a visible image.

7. A visual communication system for transmitting signals representative of the light values of an object field over a narrow band channel which comprises, means at a transmitter station for scanning said entire field in a succession of horizontal traverses to obtain a plurality of sequences of signal pulses, said means including a plurality of independent apertures arranged contiguously in the vertical direction, the linear dimensions of each of said apertures being smaller than those of the finest detail in said field, means for combining said plurality of sequences to form a single sequence of composite signal pulses, means for increasing to a preassigned period D the duration of those pulses in said sequence whose durations are less than said period D to form a modified pulse sequence, means for transmitting said modified pulse sequence to a receiver station, and means at said receiver station, for converting said modified sequence of said pulses into a visible image.

8. A visual communication system as defined in claim 7 wherein said plurality of independent apertures comprises three similar apertures and in which adjacent horizontal traverses of said field occur in paths the axes of which are separated vertically from each other by a distance equal to the sum of the dimensions of said three apertures in the vertical direction.

9. A visual communication system as defined in claim 8 wherein said preassigned period D is equal to a Nyquist interval of the bandwidth accommodated by said narrow band channel.

10. A visual communication system for transmitting signals representative of the light values of a two-valued object field over a narrow band channel which comprises, means at a transmitter station for simultaneously scanning said field with a plurality of scanning apertures to obtain a plurality of sequences of signal pulses, the linear dimensions of each of said apertures being smaller than those of the finest detail in said field whereby each pulse so obtained represents a single scanned area of one of said light values, the duration of each of said pulses being thus representative of a dimension of said single area of said field, means for combining said sequences, pulse stretching means for increasing to a preassigned period D the duration of those of said pulses whose durations are less than said period D to form a modified pulse sequence, means for transmitting said modified pulse sequence to a receiver station, and means, at said receiver station, for reconstituting said object field.

11. A system as defined in claim 10 wherein said means for combining said sequences of signal pulses comprises means responsive to signal pulses in any one of said sequences for producing an electrical pulse of preassigned amplitude.

12. A system as defined in claim 10 wherein said means for combining said sequences of signal pulses comprises a logic circuit having a plurality of input terminals and one output terminal, said input terminals being effectively isolated from each other, and means for connecting one of said sequences of pulses to each one of said input terminals 13. In a narrow band signal image transmission system, a combination which comprises, at a transmitter station, means including a plurality of apertures arranged in close proximity to one another for exploring adjacent areas of an image field of view within successive horizontal paths in said field, the axes of adjacent ones of said horizontal paths being spaced apart by a distance greater than the linear dimensions of individual ones of said apertures, means for deriving from each of said apertures respectively a sequence of analogue pulses of various magnitudes, in dependence on the light values of the corresponding elements within said areas, means simultaneously supplied with analogue pulses from each of said sequences corresponding to contiguous elements in said field for generating, in response to a pulse from any one sequence having a first preassigned magnitude but not otherwise, an output pulse of a second preassigned magnitude, thereby to form a train of pulses, means for transmitting said train of pulses to a receiver station and, at said receiver station, image reconstituting means which comprises an electron beam, a phosphor screen, means for projecting said beam onto said screen, said beam corresponding in area, with respect to individual elements within said reconstituted image, to the total area of all of said apertures at said transmitter station, means for deflecting said beam in successive horizontal paths corresponding to and synchronized with those at said transmitter station, and means for modulating said beam with said generated pulses of said second preassigned magnitude, thereby to produce a reproduction of said field of view.

14. In a narrow band image signal transmission system, the combination which comprises means for converting significant image elements in an image field of view into their electrical signal counterparts, said means including an aperture for scanning said field in a succession of horizontal traverses, means for developing a composite signal representative of said elements picked up by said aperture in any traverse and simultaneously representative of other elements vertically contiguous to said last-named element, and means for utilizing said composite signal.

References Cited in the file of this patent

UNITED STATES PATENTS

| | | |
|---|---|---|
| 1,775,241 | Horton | Sept. 9, 1930 |
| 1,786,652 | Hartley | Dec. 30, 1930 |
| 1,938,990 | Woodward | Dec. 12, 1933 |
| 2,625,604 | Edson | Jan. 13, 1953 |
| 2,653,237 | Johnstone | Sept. 22, 1953 |
| 2,817,265 | Covely | Dec. 24, 1957 |

FOREIGN PATENTS

| | | |
|---|---|---|
| 575,553 | Germany | Apr. 13, 1932 |